United States Patent
Jeong et al.

(10) Patent No.: US 9,114,526 B2
(45) Date of Patent: Aug. 25, 2015

(54) INDUSTRIAL ROBOT HAVING AN APPARATUS FOR DRIVING AN ATTACHABLE/DETACHABLE FOUR-BAR LINK MECHANISM

(75) Inventors: Hie Yong Jeong, Geoje-si (KR); Dong Soo Kang, Geoje-si (KR); Eun Jung Kim, Geoje-si (KR); Young Jun Park, Geoje-si (KR)

(73) Assignee: Samsung Heavy Ind. Co., Ltd. (KR)

( * ) Notice: Subject to any disclaimer, the term of this patent is extended or adjusted under 35 U.S.C. 154(b) by 255 days.

(21) Appl. No.: 13/697,511

(22) PCT Filed: Apr. 4, 2011

(86) PCT No.: PCT/KR2011/002329
§ 371 (c)(1),
(2), (4) Date: Nov. 12, 2012

(87) PCT Pub. No.: WO2011/142535
PCT Pub. Date: Nov. 17, 2011

(65) Prior Publication Data
US 2013/0060383 A1     Mar. 7, 2013

(30) Foreign Application Priority Data

May 13, 2010     (KR) .................. 10-2010-0044867

(51) Int. Cl.
*B25J 9/04*     (2006.01)
*B25J 9/10*     (2006.01)

(52) U.S. Cl.
CPC *B25J 9/045* (2013.01); *B25J 9/106* (2013.01); *Y10T 74/20317* (2015.01); *Y10T 74/20323* (2015.01)

(58) Field of Classification Search
USPC ................... 74/490.03, 490.01, 490.05, 425, 74/490.06; 901/23, 28, 29
See application file for complete search history.

(56) References Cited

U.S. PATENT DOCUMENTS

| | | | | |
|---|---|---|---|---|
| 4,507,043 A | * | 3/1985 | Flatau ........................... | 414/719 |
| 4,600,355 A | * | 7/1986 | Johnson ........................ | 414/680 |
| 4,718,815 A | * | 1/1988 | Lindgren ...................... | 414/729 |
| 4,776,230 A | * | 10/1988 | Susnjara ..................... | 74/490.01 |
| 4,991,456 A | * | 2/1991 | Shibata et al. ............. | 74/490.03 |
| 5,065,684 A | * | 11/1991 | Hansberry .................... | 112/311 |
| 5,549,018 A | * | 8/1996 | Nihei et al. ................. | 74/490.03 |

(Continued)

FOREIGN PATENT DOCUMENTS

| | | |
|---|---|---|
| CN | 101585067 | 11/2009 |
| JP | 02-059281 | 2/1990 |

(Continued)

*Primary Examiner* — William Kelleher
*Assistant Examiner* — Zakaria Elahmadi
(74) *Attorney, Agent, or Firm* — Harness, Dickey & Pierce, P.L.C.

(57) ABSTRACT

The invention relates to an industrial robot having an apparatus for driving an attachable/detachable four-bar link mechanism, comprising: a base frame having a rotating joint for a robot body; a pivot frame which is coupled to the rotating joint and which has a rotating joint; a column frame which is coupled to the rotating joint of the pivot frame, and which has a straight-line joint; a motor arranged in the pivot frame to rotate the column frame; a decelerator attachably/detachably mounted on the rotating joint of the pivot frame or directly on the pivot frame to receive driving force from the motor; and a four-bar link installed between an output shaft of the decelerator and the column frame.

12 Claims, 6 Drawing Sheets

(56) References Cited

U.S. PATENT DOCUMENTS

| | | | |
|---|---|---|---|
| 5,584,646 A * | 12/1996 | Lewis et al. | 414/738 |
| 5,622,084 A * | 4/1997 | Tellden | 74/490.03 |
| 5,901,613 A * | 5/1999 | Forslund | 74/490.03 |
| 5,975,834 A | 11/1999 | Ogawa et al. | |
| 6,145,403 A * | 11/2000 | Aschenbrenner et al. | 74/490.01 |
| 6,408,710 B1 * | 6/2002 | Kullborg et al. | 74/490.03 |
| 6,748,819 B2 * | 6/2004 | Maeguchi et al. | 74/490.01 |
| 7,591,625 B2 * | 9/2009 | Minami et al. | 414/217 |
| 7,645,112 B2 * | 1/2010 | Minami et al. | 414/744.5 |
| 7,794,194 B2 * | 9/2010 | Murray et al. | 414/783 |
| 7,798,035 B2 * | 9/2010 | Duval | 74/490.01 |
| 8,336,420 B2 * | 12/2012 | Carter et al. | 74/490.05 |
| 2003/0221504 A1 * | 12/2003 | Stoianovici et al. | 74/490.04 |
| 2008/0314181 A1 * | 12/2008 | Schena | 74/469 |
| 2011/0135437 A1 * | 6/2011 | Takeshita et al. | 414/744.5 |
| 2012/0048047 A1 * | 3/2012 | Zhang | 74/425 |
| 2013/0255429 A1 * | 10/2013 | Hahakura et al. | 74/490.05 |

FOREIGN PATENT DOCUMENTS

| | | |
|---|---|---|
| JP | 6-071089 | 10/1994 |
| JP | 6-320449 | 11/1994 |
| JP | 06-320449 A | 11/1994 |
| JP | 11-033950 | 2/1999 |
| JP | 2003-039352 A | 2/2003 |
| KR | 10-0519608 | 9/2005 |

* cited by examiner

INDUSTRIAL ROBOT HAVING AN APPARATUS FOR DRIVING AN ATTACHABLE/DETACHABLE FOUR-BAR LINK MECHANISM

FIELD OF THE INVENTION

The present invention relates to an industrial manipulator, and more particularly, to an industrial robot having an apparatus for driving an attachable/detachable four-bar link mechanism.

BACKGROUND

In general, an industrial robot refers to a general-purpose machine which has both motor functions and intelligence like human beings. Specifically, the industrial robot indicates a general-purpose machine which may be provided with an operating arm based on an engineering method, vision and tactile sensations to understand its environment, a function of planning and executing a working order by itself, and a unit to communicate with an operator, may freely operate, and may be programmed to perform various operations as an integrated mechanical system.

The industrial robot is designed to have an operation and loading weight optimized in the corresponding industrial field or operation process. Therefore, the industrial robot has a limitation in exhibiting different loading weights in various environments or processes like a common robot.

The common robot may refer to a robot which commonly uses a robot body. Specifically, only an end effector or tool in the robot body may be replaced depending on different operations, and a process program for a corresponding operation in a robot controller may be replaced to support another operation.

Figure 1:
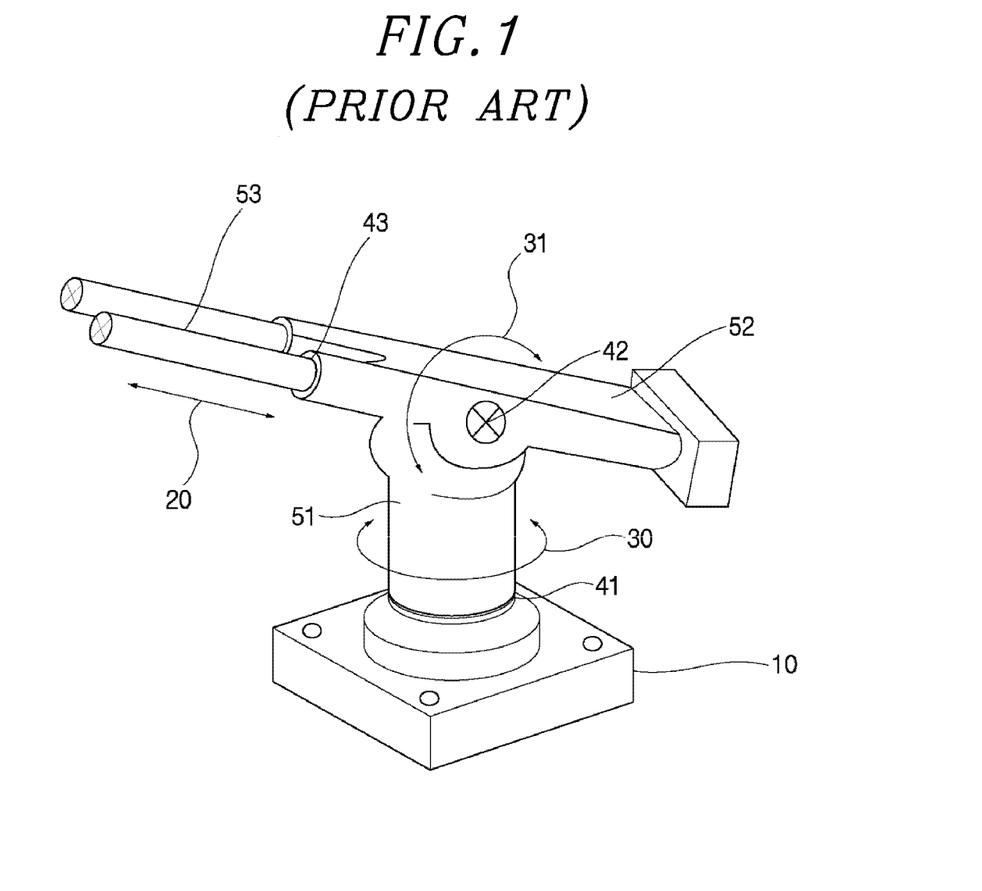
FIG. 1 is a perspective view of a conventional polar coordinate robot.

As shown in FIG. 1, a conventional polar coordinate robot includes joints 41, 42, 43 corresponding to two rotating axes 30 and 31 and one straight axis 20, and frames 51, 52, 53, which are formed over a base 10.

In the robot, a first joint 41 corresponding to the rotating axis 30 serves to rotate a first frame 51 about the base 10, a second joint 42 corresponding to the rotating axis 31 serves to vertically rotate a second frame 52 about the first frame 51, and a third joint 43 corresponding to the straight axis 20 serves to advance and retreat a third frame 53 with respect to the second frame 52.

Since the polar coordinate robot has an excellent vertical motion characteristic with respect to a vertical surface, the polar coordinate robot may perform an operation in a place of which the working area is wide and which is inclined. Therefore, the polar coordinate robot is suitable for a welding operation or coating process.

Meanwhile, when the conventional industrial robot inclusive of the polar coordinate robot is designed, it is very important to decide the loading weight of the industrial robot, in order to determine the use or purpose of the robot. The loading weight is decided by an actuator, a decelerator, a power transmission mechanism which form a joint.

Therefore, when the manufactured industrial robot is to be used for different use, there are difficulties in applying the industrial robot, as long as the loading weight thereof is not allowed. Therefore, a method capable of increasing the loading weight is strongly required.

In order to increase the loading weight, the actuator and the decelerator of the joint may be simply changed. In this case, however, the design of the robot is inevitably changed, an additional cost for purchasing a large actuator is required, and the weight of the robot body is increased. Therefore, this is almost the same as an operation of manufacturing a new industrial robot. An example for the structure for increasing the loading weight is disclosed in Korean Patent No. 10-519608 registered on Oct. 6, 2005.

Furthermore, since the conventional industrial robot may have a loading weight only within a predesigned and predetermined range, the conventional industrial robot cannot be used as a robot body of a common robot requiring different loading weights.

Furthermore, when the conventional industrial robot is docked with a separate robot for carrying the industrial robot or transferring the industrial robot, the weight of the robot body is limited. Accordingly, there are difficulties in unconditionally mounting the actuator and the decelerator having a large volume and weight on the robot.

SUMMARY

In view of the above, the present invention provides an industrial robot having an apparatus for driving an attachable/detachable four-bar link mechanism, which is capable of changing a loading weight without adding a separate actuator or changing a decelerator capacity, using the apparatus for driving a four-bar link mechanism attached to and detached from a body of the robot.

In accordance with an aspect of the present invention, there is provided an industrial robot having an apparatus for driving an attachable/detachable four-bar link mechanism, which includes: a base frame having a rotating joint for a robot body; a pivot frame having a revolving joint and coupled to the rotating joint; a column frame having a straight-line joint and coupled to the revolving joint; a motor installed in the pivot frame to rotate the column frame; a decelerator receiving a driving force from the motor and attachably/detachably installed on the revolving joint or the pivot frame; and a four-bar link installed between an output shaft of the decelerator and the column frame.

In accordance with the embodiments of the present invention, the loading weight of the industrial robot having an apparatus for driving an attachable/detachable four-bar link mechanism may be increased or decreased by changing the installation position of the decelerator and connecting the attachable/detachable four-bar link between the decelerator and the column frame, without adding a separate actuator or changing the capacity of the decelerator.

Therefore, the loading weight may be changed or the stiffness of the robot may be increased, without significantly increasing the weight of the robot body compared to the addition of a separate actuator.

Furthermore, the industrial robot having an apparatus for driving an attachable/detachable four-bar link mechanism may be used as a body of a common robot requiring different loading weights.

Furthermore, since the existing decelerator is used to increase the loading weight of the industrial robot having an apparatus for driving an attachable/detachable four-bar link mechanism, it is possible to reduce a manufacturing cost, compared to a robot having a separate actuator or decelerator to increase a loading weight.

DETAILED DESCRIPTION

Hereinafter, an apparatus for driving an attachable/detachable four-bar link mechanism in accordance with embodiments of the present invention will be described in detail with reference to FIG. 2 to FIG. 6. While the embodiments are described, they are exemplary ones only and do intend not to limit the scope of the present invention.

Figure 2:
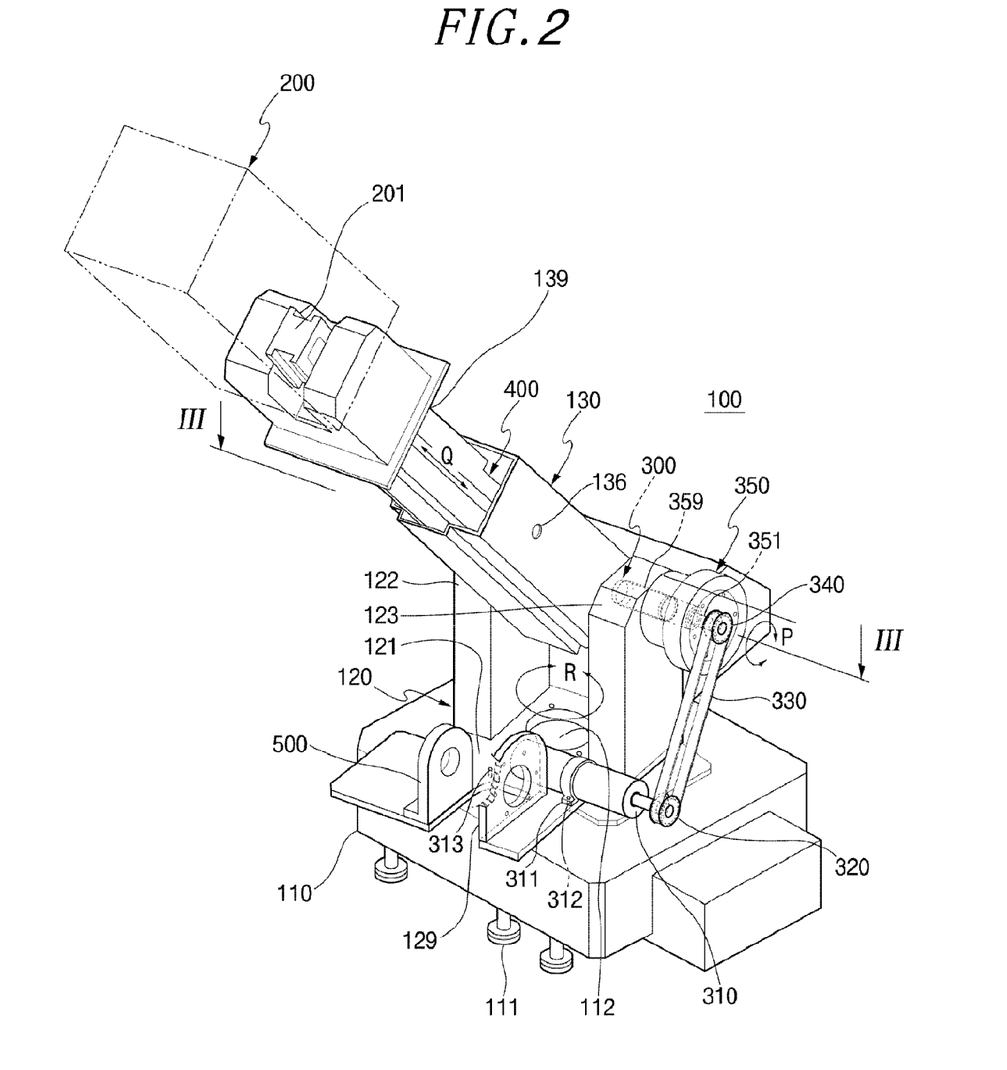
FIG. 2 is a perspective view of an industrial robot having an apparatus for driving an attachable/detachable four-bar link mechanism in accordance with an embodiment of the present invention.

FIG. 2 is a perspective view of an industrial robot having an apparatus for driving an attachable/detachable four-bar link mechanism in accordance with an embodiment of the present invention.

Referring to FIG. 2, the industrial robot in accordance with the embodiment of the present invention includes an end effector and tool assembly 200, and a robot body 100 having a coupling unit 201 provided at a free end of a straight-line movement unit 139. The end effector and tool assembly 200 serves to implement a function corresponding to a process in which the robot is to be used. The coupling unit 201 is used to physically and electronically attach/detach the end effector and tool assembly 200.

The robot body 100 includes a base frame 110, a pivot frame 120, a column frame 130, and the straight-line movement unit 139. The base frame 110 includes a plurality of level adjusters 111 for controlling the height thereof according to a screw tightening method. The pivot frame 120 is coupled to pivot in an R direction illustrated in FIG. 2 within a limited rotation angle range over the base frame 110. The column frame 130 is coupled to rotate in a P direction perpendicular to the R direction within a limited tilting angle in the pivot frame 120. The straight-line movement unit 139 is coupled to advance or retreat in a stroke direction, for example, a Q direction within a limited stroke range in the column frame 130.

The plurality of level adjusters 111 for height control is formed to protrude downward from the bottom surface of the base frame 110.

Furthermore, a rotating joint 112 corresponding to a first joint of the robot body 100 is provided between the base frame 110 and the pivot frame 120 or over the base frame 110. The rotating joint 112 may include a motor-driven main actuator and a deceleration gear box (not illustrated) which are coupled inside a housing of the base frame 110. The rotating joint 112 serves to rotate the pivot frame 102 in the R direction based on the base frame 110.

When the pivot frame 120 pivots in the R direction, it may mean that the pivot frame 120 or a bottom plate 121 of the pivot frame 120 and components or assemblies installed or formed over the bottom plate pivot about the base frame 110.

The bottom plate 121 of the pivot frame 120 may include a vertical bracket 129 and a bearing support 500. The vertical bracket 129 is used to install a decelerator 350 and the bearing support 500 serves to rotatably support an output shaft 359 of the decelerator 350 when the decelerator 350 is installed.

A revolving joint 300 corresponding to a second joint of the robot body 100 is disposed to rotate the column frame 130 in the P direction between left and right pivot protrusions 122 and 123 protruding upward from both sides of the bottom plate 121 of the pivot frame 120.

The column frame 130 has a joint hole 136 formed on one side surface or both side surfaces of the upper end portion thereof and reserved for a revolving link unit 620 of a four-bar link 600 which will be described in detail with reference to FIGS. 5 and 6.

The revolving joint 300 includes a servo motor 310 installed on the bottom plate 121 of the pivot frame 120, a first pulley 320 installed on a rotational shaft of the servo motor 310, a first timing belt 330 having one side coupled to the first pulley 320, and a second pulley 340 coupled to the other side of the first timing belt 330, in order to generate a basic loading weight (for example, 5~10 kgf). The second pulley 340 has an input shaft 351 coupled to the decelerator 350. In this embodiment, the decelerator 350 may include a harmonic drive.

Basically, the housing of the decelerator 350 may be installed on the upper portion of the outer surface of the right pivot protrusion 123 through six attachable installation bolts.

The first pulley 320 and the first timing belt 330 or a second timing belt 331 and the second pulley 340, which will be described with reference to FIG. 5, may serve as a pulley-belt type power transmission mechanism.

Furthermore, the servo motor 310 and the pulley-belt type power transmission mechanism may serve as an actuator for the revolving joint 300.

The output shaft 359 of the decelerator 350 is coupled to transmit an output torque to the column frame 130. That is, an end of the output shaft 359 of the decelerator 350 is connected to the column frame 130 through the right pivot protrusion 123.

Furthermore, a straight-line joint 400 corresponding to a third joint of the robot body 100 may be provided with a telescopic mechanism between the column frame 130 and the straight-line movement unit 139. In this regard, the telescopic mechanism may include an internal actuator (for example, a rack and pinion deceleration driving device) to move the end effector and tool assembly 200 by advancing or retreating the straight-line movement unit 139 in the Q direction with respect to the column frame 130.

When the decelerator 350 is attachably coupled to the revolving joint 300 as illustrated in FIG. 2, the robot body 100 may exhibit a basic loading weight (for example, 5~10 kgf) corresponding to a predetermined design value.

The coupling relation and operation relation of the revolving joint 300 exhibiting the basic loading weight will be described with reference to FIG. 3.

Figure 3:
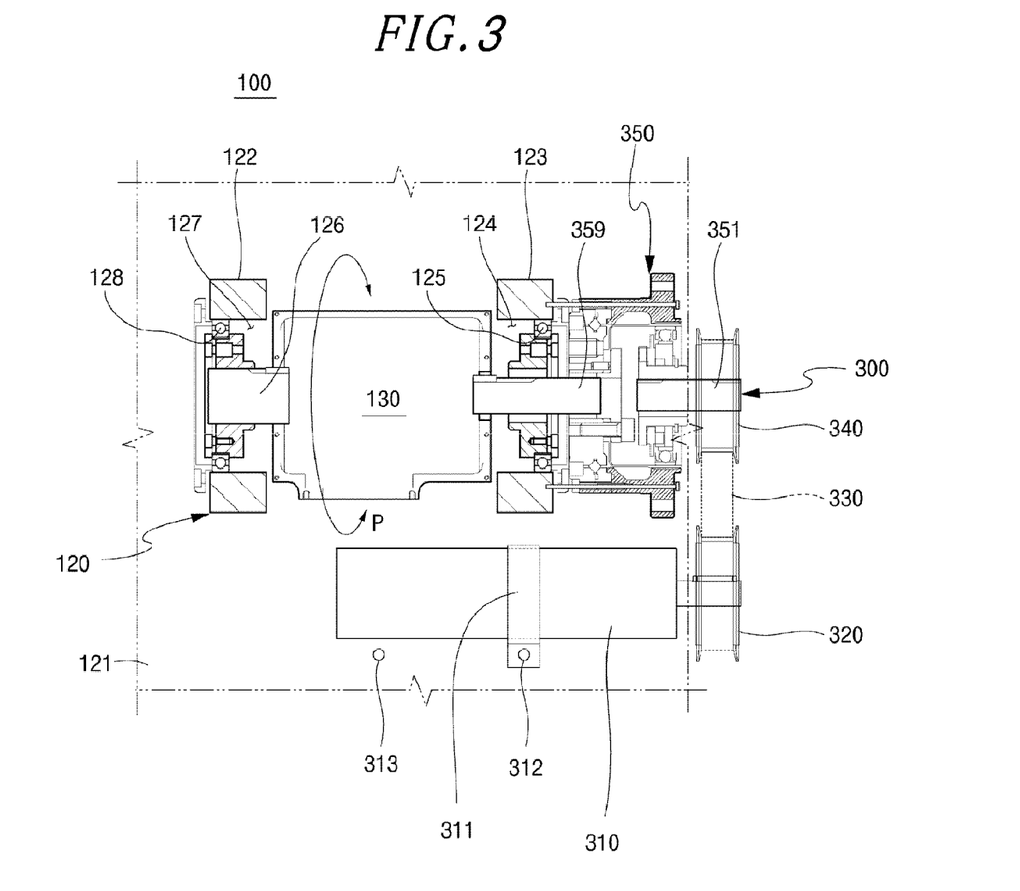
FIG. 3 is a cross-sectional view taken along line III-III of FIG. 2.

FIG. 3 is a cross-sectional view taken along line III-III of FIG. 2.

As shown in FIG. 3, the motor driving force of the servo motor 310 is transmitted to the revolving joint 300. The first pulley 320, the first timing belt 320, and the second pulley 340 are rotated by the motor driving force, and the decelerator 350 is operated by the input shaft 351 coupled to the rotating shaft of the second pulley 340, thereby generating an output corresponding to a deceleration ratio of the decelerator 350.

The end of the output shaft 359 receiving the output corresponding to the deceleration ratio of the decelerator 350 is connected to one side surface of the column frame 130 through a shaft center hole of a first bearing assembly 125 in a mounting space 124 formed in the right pivot protrusion 123, thereby revolving the column frame 130 in the P direction in response to the output.

The other side surface of the column frame 130 is connected to one end of a pivot shaft 126. The other end of the pivot shaft 126 is coupled to a second bearing assembly 128 installed in the mounting space 127 formed in the left pivot protrusion 122.

When the column frame 130 is rotated depending on the output corresponding to the deceleration ratio of the decelerator 350 as the servo motor 310 is driven, the first and second bearing assemblies 125 and 128 serves to rotatably support the column frame 130 while reducing a frictional force based on the left and right pivot protrusions 122 and 123.

In this way, the robot body 100 including the revolving joint 300 illustrated in FIGS. 2 and 3 may exhibit the basic loading weight (for example, 5~10 kgf) corresponding to a predetermined design value according to a combination of the servo motor 310 and the decelerator 350.

Meanwhile, the servo motor 310 is installed so as to be attached to and detached from the bottom plate 121 of the pivot frame 120 through the first or second installation hole 312 or 313, using an attachable installation band or the bracket 311.

Figure 5:
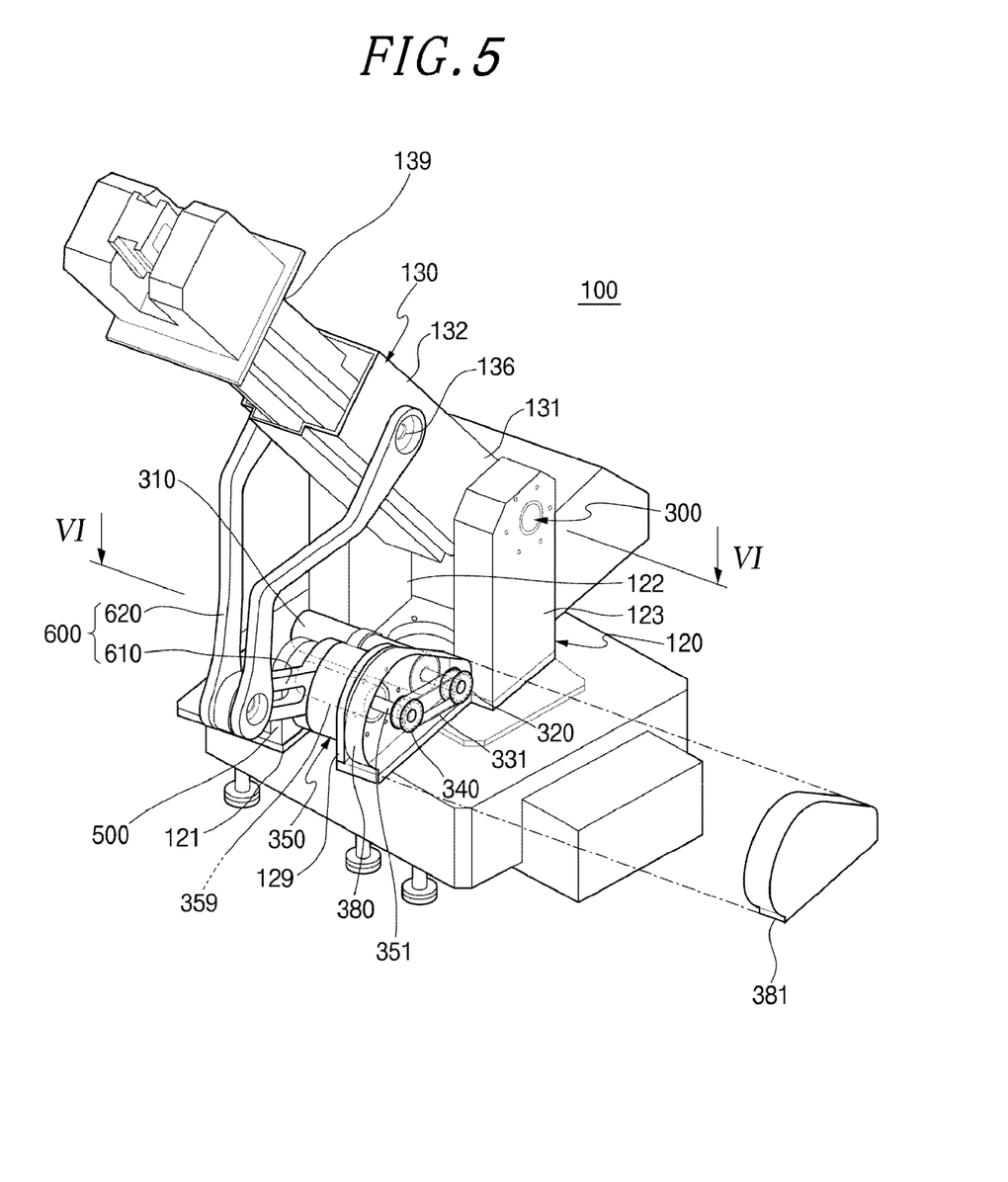
FIG. 5 is a perspective view illustrating a state in which the attachable/detachable four-bar link mechanism is coupled in the installation position of a decelerator in the robot body illustrated in FIG. 2.
Figure 6:
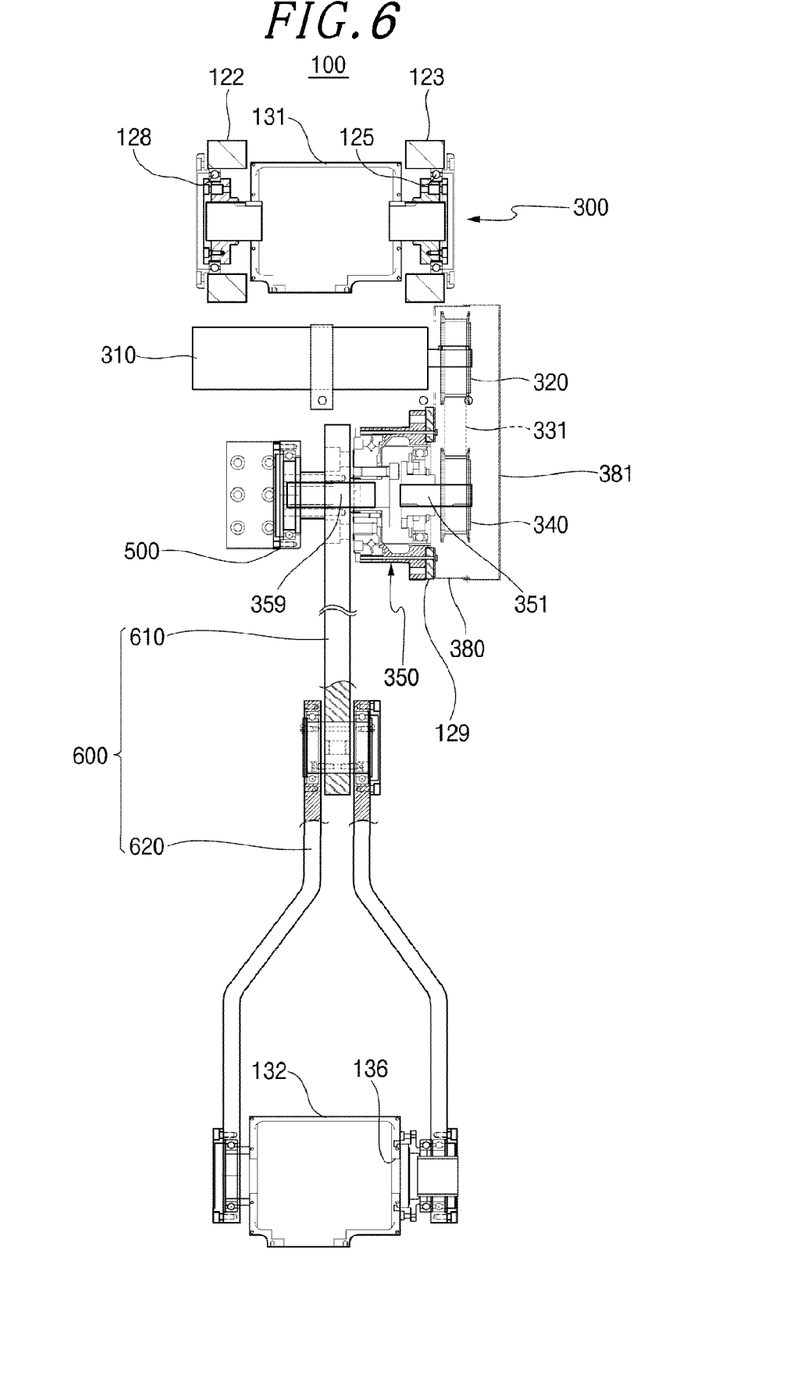
FIG. 6 is a cross-sectional view taken along line VI-VI of FIG. 5.

The first installation hole 312 is used when the servo motor 310 is installed as illustrated in FIGS. 2 and 3, and the second installation hole 313 is used when the servo motor 310 is moved to the left side and installed as illustrated in FIGS. 5 and 6.

Figure 4:
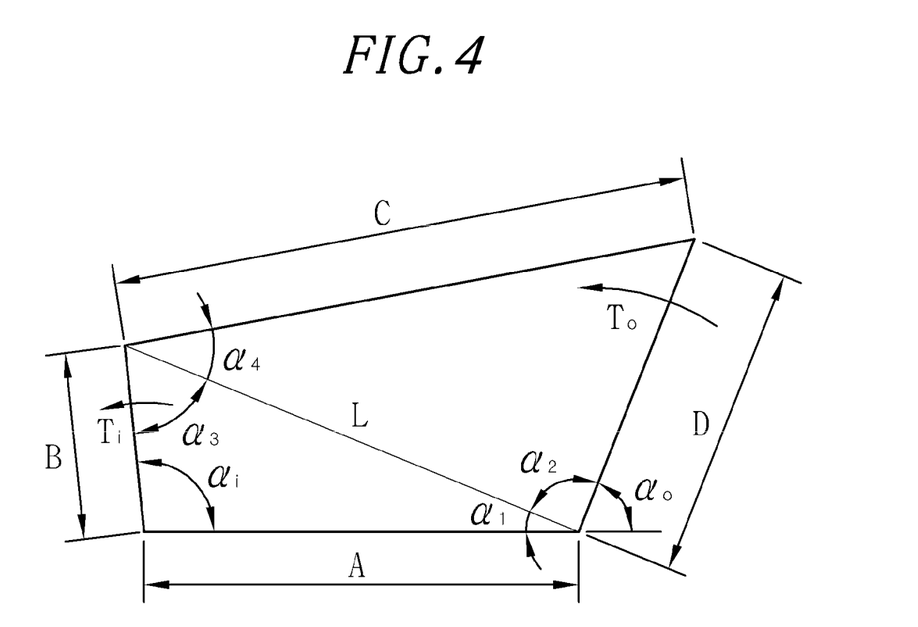
FIG. 4 is a geometric schematic diagram for explaining the changing principle of loading weight of the apparatus for driving an attachable/detachable four-bar link mechanism in accordance with the embodiment of the present invention.

The principle of changing the loading weight of the apparatus for driving an attachable/detachable four-bar link mechanism in accordance with the embodiment of the present invention will be described with reference to FIG. 4. FIG. 4 is a geometric schematic diagram for explaining the changing principle of the loading weight of the apparatus for driving an attachable/detachable four-bar link mechanism in accordance with the embodiment of the present invention.

Referring to FIG. 4, the four-bar link may be constructed by connecting corner points formed by the respective links, which may be represented by A, B, C, and D). For example, an input link B having a predetermined length may be arranged in the left side, an output link D having a predetermined length may be arranged in the right side, and connection links A and C having predetermined lengths may be arranged at the top and bottom of the input and output links B and D. Furthermore, a diagonal line L for geometric analysis may be arranged from the corner point between the links B and C to the corner point between the links D and A.

In such an arrangement state, angles around the respective corner points may be calculated by Equation 1.

$$\alpha_1 = \cos^{-1}\left(\frac{A - B\cos\alpha_i}{\sqrt{A^2 + B^2 - 2AB\cos\alpha_i}}\right) \quad \text{[Equation 1]}$$

$$\alpha_2 = \cos^{-1}\left(\frac{A^2 + B^2 - C^2 + D^2 - 2AB\cos\alpha_i}{2D\sqrt{A^2 + B^2 - 2AB\cos\alpha_i}}\right)$$

$$\alpha_3 = \cos^{-1}\left(\frac{B - A\cos\alpha_i}{\sqrt{A^2 + B^2 - 2AB\cos\alpha_i}}\right)$$

$$\alpha_4 = \cos^{-1}\left(\frac{A^2 + B^2 + C^2 - D^2 - 2AB\cos\alpha_i}{2C\sqrt{A^2 + B^2 - 2AB\cos\alpha_i}}\right)$$

where $\alpha_i$ represents an input internal angle formed by the input link B and the bottom connection link A; $\alpha_1$ represents a first internal angle formed by the lower connection link A and the diagonal line L from the corner point between the links B and C to the corner point between the links D and A; $\alpha_2$ represents a second internal angle formed by the diagonal line L and the output link D; $\alpha_3$ represents a third internal angle formed by the diagonal line L and the input link B; and $\alpha_4$ represents a fourth internal link formed by the diagonal line L and the top connection link C.

When the first to fourth internal angles $\alpha_1$, $\alpha_2$, $\alpha_3$, and $\alpha_4$, the input link B, and the output link D are used, the relation between an input torque $T_i$ and an output torque $T_o$ may be described as expressed by Equation 2.

$$T_0 = T_i \frac{D\sin(\alpha_2 + \alpha_4)}{B\sin(\alpha_3 + \alpha_4)} \quad \text{[Equation 2]}$$

where $T_o$ represents an output torque of the four-bar link; $T_i$ represents an input torque of the four-bar link; $B_L$ repressnts the length of the input link B, $D_L$ represents the length of the output link D; $\alpha_2$ represents the second internal angle formed by the diagonal line L and the output link D; $\alpha_3$ represents the third internal angle formed by the diagonal line L and the input link B; and $\alpha_4$ represents the fourth internal link formed by the diagonal line L and the top connection link C.

Referring to Equation 2 which is a relational expression between the input torque $T_i$ and the output torque $T_o$, it can be seen that the length $B_L$ of the input link B and the length $D_L$ of the output link D have relations with each other. More specifically, when the length $B_L$ of the input link B is larger than the length $D_L$ of the output link D, the output torque $T_o$ decreases with respect to the input torque $T_i$. On the contrary, when the length $B_L$ of the input link B is smaller than the length $D_L$ of the output link D, the output torque $T_o$ increases with respect to the input torque $T_i$.

Therefore, as shown in FIGS. 5 and 6, the decelerator 350 installed as illustrated in FIG. 2 is changed in its installation position depending on the attachable/detachable four-bar link 600, the four-bar link 600 is then connected between the decelerator 350 and the column frame 130, and the length of the four-bar link 600 is controlled using a design parameter, resulting in the change of the loading weight, for example, an increase of the loading weight without an additional decelerator.

In other words, the apparatus for driving an attachable/detachable four-bar link mechanism in accordance with the embodiment of the present invention may include the four-bar link 600, the pull-belt type power transmission mechanism, the decelerator 350, and the servo motor 310 to implement the changed loading weight (for example, 10~20 kgf). That is, the changed loading weight may be implemented by changing the installation position of the decelerator 350 and attaching the four-bar link mechanism 600.

Referring to FIGS. 5 and 6, after the decelerator 350 installed as illustrated in FIG. 2 is moved in relation to the four-bar link 600, the lower end portion of the column frame 130 is rotatably coupled to the first and second bearing assemblies 125 and 128 of the left and right pivot protrusions 122 and 123 of the pivot frame 120.

The servo motor 310 is installed on the bottom plate 121 of the pivot frame 120 at the front side of the left and right pivot protrusions 122 and 123 using the second installation hole 313 of the driving motor 310 (see FIG. 2 or FIG. 3).

The servo motor 310 transmits a motor driving force to the decelerator 350 through the first pulley 320 at the servo motor 310, the second timing belt 331 having a small length than the first timing belt, and the second pulley 340 at the decelerator 350.

The housing of the decelerator 350 separated from the upper portion of the outer surface of the right pivot protrusion 123 is installed on the bottom plate of the pivot frame 120.

More specifically, the housing of the decelerator 350 is attachably fixed to the vertical bracket 129 erected vertically at a front position of the servo motor 310 in the right side of the bottom plate 121 of the pivot frame 120. For example, the housing of the decelerator 350 is coupled to the left side surface of the verical bracket 129.

A protective casing 380 for protecting the first pulley 320, the second timing belt 331, and the second pulley 340 may be installed on the right side surface of the vertical bracket 129. The protective casing 380 has through-holes through which the first and second pulleys 320 and 340 pass. The protective casing 380 may be coupled to a protective cover 381 through a fixing screw or the like so as to cover the opening of the protective casing 380 positioned in the opposite side of the through-holes.

In addition, the output shaft 359 of the decelerator 350 is coupled to the bearing support 500 erected vertically at the front position of the servo motor 310 in the left side of the bottom plate 121 of the pivot frame 120. The bearing support 500 rotatably supports the output shaft 359 of the decelerator 350 such that the output of the output shaft 359 is stably transmitted to the four-bar link 600.

The four-bar link 600 may include an operating arm 610 and a revolving link unit 620. The operating arm 610 is connected to the output shaft 359 of the decelerator 350 according to a shaft coupling method and receives the output of the decelerator 350. The revolving link unit 620 has one end connected to the operating arm 510 according to a rotating joint method and the other end connected to around the joint hole 136 of the upper end portion 132 of the column frame 130.

In the embodiments, the shaft coupling method or rotataing joint method may refer to a method of rotatably coupling any one or combination of a bearing assembly, a shaft-coupling key member, a spline member, a force-fitting member, and a bushing member, that may have a ring-shaped cover attachably provided thereon, to an assembling target such as the operating arm 510 or the revolving link unit, and attaching and detachcing the assembly or member or the combiation, if necessary.

The revolving link unit 620 may include a pair of bent links formed in a Y shape as illustrated in FIGS. 5 and 6 so as to coupled to both side surfaces of the upper end portion of the column frame 130. Alternativley, the revolving link unit 620 may include a straight-line link adapted to couple to one side surface of the upper end portion of the column frame 130.

In case where the change of the loading weight or the increase in stiffness of the robot is required, the decelerator 350 may be detached from the revolving joint 200 illustrated in FIG. 2, and the four-bar link 600 may be coupled with the decelerator 350 as illustrated in FIG. 5. Then, the robot body 100 may obtain an increased rotating force at the free end of the straight-line movement unit 139 of the column frame 130. In particular, the operating arm 610 may correspond to the input link B described with reference to FIG. 4, and the column frame 130 may correspond to the output link D.

Therefore, as illustrated in FIG. 5, when the length of the operating arm 610 is set to be smaller than the length of the column frame 130, the loading weight applied to the column frame 130 increases as the output torque $T_o$ relatively increases with respect to the input torque $T_i$ in Equation 2.

On the other hand, when the length of the operating arm 610 is set to be larger than the length of the column frame 130, the loading weight applied to the column frame 130 may decrease as the output torque $T_o$ relatively decreases with respect to the input torque $T_i$ in Equation 2.

In accordance with the embodiment of the present invention, a plurality of operating arms may be prepared to have various lengths in response to loading weights required.

Furthermore, the operating arm 610 may be provided with a well-known expandsion and contraction adjustment structure such as a telescopic mechanism, a ball joint mechanism, or a screw mechanism to adjust or vary the length of the operating arm 610.

As described above, the position of the decelerator 350 is changed and the four-bar link mechanism 600 is mounted on the robot body 100 in accordance with the embodiment, in order to obtain an effect of changing the loading weight or increasing the torque without performing large design change. However, When the four-bar link 600 becomes unnecessary, the loading weight may be simply changed by removing the four-bar link 600 from the robot body 100. Accordingly, the robot may be utilized as a common robot.

While the invention has been shown and described with respect to the preferred embodiments, it will be understood by those skilled in the art that various changes and modifications may be made without departing from the scope of the invention as defined in the following claims.

What is claimed is:

1. An industrial robot having an apparatus for driving an attachable/detachable four-bar link mechanism to exhibit a loading weight, comprising:
   a base frame having a rotating joint for a robot body;
   a pivot frame having a revolving joint and coupled to the rotating joint;
   a column frame having a straight-line joint and coupled to the revolving joint;
   a decelerator selectively attachably/detachably installed on one of the revolving joint or the pivot frame to rotate the column frame, wherein an installation position of the decelerator is changable from one of the revolving joint and the pivot frame to the other of the revolving joint and the pivot frame to result in a change of the loading weight;
   a motor installed in the pivot frame to transmit a driving force to the decelerator; and
   a four-bar link attached between an output shaft of the decelerator and the column frame when the decelerator is installed on the pivot frame,
   wherein the change of the loading weight is implemented by changing the installation position of the decelerator and attaching the four-bar link.

2. The industrial robot of claim 1, wherein the pivot frame comprises pivot protrusions formed to protrude upward from both sides thereof and having a bearing assembly for coupling a lower end portion of the column frame.

3. The industrial robot of claim 1, wherein the pivot frame comprises a vertical bracket formed for the installation of the decelerator.

4. The industrial robot of claim 1, wherein the pivot frame comprises a bearing support formed to rotatably support the output shaft of the decelerator.

5. The industrial robot of claim 4, wherein the four-bar link comprises a pull-belt type power transmission mechanism to transmit the driving force of the motor to the decelerator, and wherein the pulley-belt type power transmission mechanism comprises:
a first pulley installed on a rotating shaft of the servo motor;
a timing belt having one side coupled to the first pulley; and
a second pulley coupled to the other side of the timing belt and having an input shaft coupled to the decelerator.

6. The industrial robot of claim 1, wherein the revolving joint comprises a pulley-belt type power transmission mechanism to transmit the driving force of the motor to the decelerator, and
wherein the pulley-belt type power transmission mechanism comprises:
a first pulley installed on a rotating shaft of the servo motor;
a timing belt having one side coupled to the first pulley; and
a second pulley coupled to the other side of the timing belt and having an input shaft coupled to the decelerator.

7. The industrial robot of claim 1, wherein the four-bar link comprises:
an operating arm coupled to the output shaft of the decelerator according to a shaft coupling method and receiving an output of the decelerator; and
a revolving link unit having one end connected to the operating arm according to a rotating joint method and the other end connected to an upper end portion of the column frame according to the rotating joint method.

8. The industrial robot of claim 7, wherein the four-bar link is adapted to change the loading weight using the following equation on the relation between an input link and input torque corresponding to the operating arm and an output link and output torque corresponding to the column frame:

$$T_0 = T_i \frac{D\sin(\alpha_2 + \alpha_4)}{B\sin(\alpha_3 + \alpha_4)}$$

where $T_o$ represents an output torque of the four-bar link; $T_i$ represents an input torque of the four-bar link; B represents the input link; $B_L$ represents the length of the input link B; D represents the output link; $D_L$ represents the length of the output link D; $\alpha_2$ represents an internal angle formed by the output link B and a diagonal line L from a corner point between the input link B and a top connection link to a corner point between the output link D and a bottom connection link; $\alpha_3$ represents an internal angle formed by the diagonal line L and the input link B; $\alpha_4$ represents an internal link formed by the diagonal line L and the top connection link, the top connection link comprises a link connected between upper ends of the input link B and the output link D; and the bottom connection link comprises a link connected between lower ends of the input link B and the output link D.

9. The industrial robot of claim 2, wherein the pivot frame comprises a bearing support formed to rotatably support the output shaft of the decelerator.

10. The industrial robot of claim 3, wherein the pivot frame comprises a bearing support formed to rotatably support the output shaft of the decelerator.

11. The industrial robot of claim 9, wherein the four-bar link comprises a pull-belt type power transmission mechanism to transmit the driving force of the motor to the decelerator, and
wherein the pulley-belt type power transmission mechanism comprises:
a first pulley installed on a rotating shaft of the servo motor;
a timing belt having one side coupled to the first pulley; and
a second pulley coupled to the other side of the timing belt and having an input shaft coupled to the decelerator.

12. The industrial robot of claim 10, wherein the four-bar link comprises a pull-belt type power transmission mechanism to transmit the driving force of the motor to the decelerator, and
wherein the pulley-belt type power transmission mechanism comprises:
a first pulley installed on a rotating shaft of the servo motor;
a timing belt having one side coupled to the first pulley; and
a second pulley coupled to the other side of the timing belt and having an input shaft coupled to the decelerator.

* * * * *